United States Patent
Na et al.

(10) Patent No.: US 9,959,955 B2
(45) Date of Patent: May 1, 2018

(54) SUPERCONDUCTING CABLE

(71) Applicant: LS Cable & System LTD., Anyang-si, Gyeonggi-do (KR)

(72) Inventors: Jin-Bae Na, Seoul (KR);
Young-Woong Kim, Suwon-si (KR);
Chang-Youl Choi, Ansan-si (KR);
Heo-Gyung Sung, Pyeongtaek-si (KR);
Seok-Ju Lee, Gumi-si (JP)

(73) Assignee: LS CABLE & SYSTEM LTD., Anyang-si, Gyeonggi-do (KR)

( * ) Notice: Subject to any disclaimer, the term of this patent is extended or adjusted under 35 U.S.C. 154(b) by 0 days. days.

(21) Appl. No.: 15/513,324

(22) PCT Filed: Jul. 16, 2015

(86) PCT No.: PCT/KR2015/007417
§ 371 (c)(1),
(2) Date: Mar. 22, 2017

(87) PCT Pub. No.: WO2016/047909
PCT Pub. Date: Mar. 31, 2016

(65) Prior Publication Data
US 2017/0309374 A1    Oct. 26, 2017

(30) Foreign Application Priority Data

Sep. 22, 2014 (KR) .......................... 10-2014-0125878
Jun. 9, 2015 (KR) .......................... 10-2015-0081385

(51) Int. Cl.
*H01B 12/00* (2006.01)
*H01L 39/24* (2006.01)
(Continued)

(52) U.S. Cl.
CPC ............... *H01B 12/06* (2013.01); *H01B 1/02* (2013.01); *H01B 1/026* (2013.01); *H01B 12/08* (2013.01); *Y02E 40/641* (2013.01)

(58) Field of Classification Search
CPC ....... H01B 12/06; Y02E 40/641; H01L 31/02; H01L 31/026; H01L 312/08
(Continued)

(56) References Cited

U.S. PATENT DOCUMENTS 6,649,280 B1 * 11/2003 Scudiere ................. B32B 15/04
                                                          428/632
6,916,991 B2 * 7/2005 Darmann .............. H01L 39/143
                                                          174/125.1
(Continued)

FOREIGN PATENT DOCUMENTS

JP    2002-140943 A    5/2002
JP    2006-216507 A    8/2006
(Continued)

OTHER PUBLICATIONS

International Search Report for PCT/KR2015/007417 dated Nov. 24, 2015 from Korean Intellectual Property Office.

*Primary Examiner* — Sherman Ng
(74) *Attorney, Agent, or Firm* — Paratus Law Group, PLLC (57) ABSTRACT

A superconducting cable includes a core part, in which the core part includes a former including a plurality of copper wires, a superconducting conductor layer including a plurality of superconducting wires connected in parallel to each other, an insulating layer, and a superconducting shield layer including a plurality of superconducting wires are sequentially arranged. A conducting layer formed of a metal having a current-carrying property at room temperature is provided on opposite surfaces of each of the superconducting wires of the superconducting conductor layer to reinforce mechanical (Continued)

rigidity of each of superconducting wires of the superconducting conductor layer, and the former has a cross-sectional area which is smaller than that of a former of a superconducting cable in which the conducting layer is not added to superconducting wires and which is designed on an assumption that all fault current flows to the former.

18 Claims, 6 Drawing Sheets

(51) Int. Cl.
  *H01B 12/06* (2006.01)
  *H01B 1/02* (2006.01)
  *H01B 12/08* (2006.01)
(58) Field of Classification Search
  USPC .................................... 174/125.1; 505/230
  See application file for complete search history.

(56) References Cited

U.S. PATENT DOCUMENTS

| | | | |
|---|---|---|---|
| 7,091,423 B2* | 8/2006 | Yumura | H01B 12/06 174/125.1 |
| 2003/0059652 A1* | 3/2003 | Wang | C04B 35/4521 428/702 |
| 2006/0175078 A1* | 8/2006 | Yumura | H01B 12/02 174/125.1 |
| 2011/0203829 A1 | 8/2011 | Jang et al. | |

FOREIGN PATENT DOCUMENTS

| | | |
|---|---|---|
| JP | 2012-074340 A | 4/2012 |
| JP | 2014-154320 A | 8/2014 |
| KR | 10-2010-0048655 A | 5/2010 |

* cited by examiner

SUPERCONDUCTING CABLE

CROSS REFERENCE TO PRIOR APPLICATIONS

This application is a National Stage Patent Application of PCT International Patent Application No. PCT/KR2015/007417 (filed on Jul. 16, 2015) under 35 U.S.C. § 371, which claims priority to Korean Patent Application Nos. 10-2014-0125878 (filed on Sep. 22, 2014), and 10-2015-0081385 (filed on Jun. 9, 2015), which are all hereby incorporated by reference in their entirety.

TECHNICAL FIELD

The present invention relates to a superconducting cable, and more particularly, to a superconducting cable, in which the physical rigidity of superconducting wires are reinforced and a shunt path of fault current is diversified to reduce the diameter (or the cross-sectional area) or the weight of a former.

BACKGROUND ART

A superconducting wire has an electric resistance which converges close to zero at a certain temperature and has a high power transfer capability even at a low voltage.

In a superconducting cable having such superconducting wires, a cooling method performed using a refrigerant such as nitrogen and/or an insulation method of forming a vacuum layer is used to form and maintain an extremely low-temperature environment.

Tension or torsion may be continuously applied to a conventional superconducting cable when superconducting wires thereof are wound around a drum or the like while being spirally wound around an outer side of a former or the like to manufacture the superconducting cable or when the superconducting cable is bent in an installation section. The superconducting wire having a thickness of only about 0.1 mm may be broken due to stress such as tension or torsion. In particular, since a ratio of the costs of the superconducting wires in total costs of the superconducting cable is highest and thus the durability or physical reliability of the superconducting wires is required.

A former may be included at an innermost part of a core part of the superconducting cable. The former may include a plurality of element wires formed of a metal such as copper. By connecting the element wires of the former to the superconducting wires in parallel, the former may serve as a return circuit when fault current is generated in an electric power system of a superconducting system.

However, since general metal conductors are used as the wires of the former serving as the return circuit of the fault current, the former has a diameter greater than that of the superconducting wires and thus accounts for a greater part of the diameter of the entire superconducting cable.

However, a superconducting cable with superconducting wires having reinforced rigidity and capable of reducing the diameter of a former or the like has yet to be introduced.

DETAILED DESCRIPTION OF THE INVENTION

Technical Problem

The present invention is directed to a superconducting cable, in which the physical rigidity of superconducting wires is reinforced, and furthermore, a shunt path of fault current is diversified to reduce the diameter (or the cross-sectional area) or the weight of a former.

Technical Solution

According to an aspect of the present invention, the present invention provides a superconducting cable comprising a core part, in which the core part includes a former including a plurality of copper wires, a superconducting conductor layer including a plurality of superconducting wires, an insulating layer, and a superconducting shield layer including a plurality of superconducting wires are sequentially arranged, wherein the former and the superconducting wires of the superconducting conductor layer are connected in parallel to each other, wherein a conducting layer formed of a metal having a current-carrying property at room temperature is provided on opposite surfaces of each of the superconducting wires of the superconducting conductor layer to reinforce mechanical rigidity of each of superconducting wires of the superconducting conductor layer, and wherein the former has a cross-sectional area which is smaller than that of a former of a superconducting cable in which the conducting layer is not added to superconducting wires and which is designed on an assumption that all fault current flows to the former.

And a minimum cross-sectional area of the former of the core part may satisfy a minimum short-circuit condition of 50 KA/sec or 25 KA/0.5 sec.

And in the superconducting cable to which superconducting wires having added thereto no conducting layer and having a width of x mm and a thickness of y mm is applied, if a minimum cross-sectional area of the former satisfying a minimum short-circuit condition which is a minimum current-carrying rate condition required for a predetermined time when an electrical short-circuit accident occurs is A mm$^2$ or more, the conducting layer may be formed of a brass material, and a semiconductor wire having added thereto the conducting layer may have a width of x mm and a thickness of 3y to 5y, the former has a minimum cross-sectional area of 0.6 A mm$^2$ to 0.9 A mm$^2$.

And the superconducting wires may comprise a silver (Ag) layer, and the conducting layer and the silver (Ag) layer of each of the superconducting wires of the superconducting conductor layer are electrically connected to each other by soldering side surfaces of the superconducting wires or coating surfaces of the superconducting wires with a metal.

And tensile strength of the superconducting wires having added thereto the conducting layer may be 200 Mpa to 800 Mpa with respect to a 95 percent current attenuation (IC relentation) criterion.

And the conducting layer added to the opposite surfaces of each of the superconducting wires may have a thickness of 0.1 mm to 0.2 mm.

And according to an aspect of the present invention, the present invention provides a superconducting cable comprising a former, at least one-layer superconducting conductor layer including a plurality of superconducting wires arranged in parallel at an outer side of the former and in a lengthwise direction of the former and at least one-layer superconducting shield layer including a plurality of superconducting wires arranged in parallel at an outer side of the superconducting conductor layer and in the lengthwise direction of the former, wherein the superconducting wires of the superconducting conductor layer and the superconducting shield layer comprise a metal substrate layer, a plurality of deposition layers deposited on the metal substrate layer, the deposition layers including a superconducting layer and a silver (Ag) layer provided at an outer side of the deposition layers and formed of a silver material, wherein a conducting layer formed of a metal having a current-carrying property at room temperature is added to opposite outer surfaces of the metal substrate layer and the silver (Ag) layer of the superconducting wires, the conducting layer used as a return conductor of fault current when the fault current is generated, together with the former.

And the metal used to form the conducting layer may be a brass material.

And the conducting layer may have a thickness of 0.1 mm to 0.2 mm.

And a minimum cross-sectional area of the former satisfying a minimum short-circuit condition which is a minimum current-carrying rate condition required for a predetermined time during occurrence of an electrical short-circuit accident may be smaller when a metal conducting layer having a predetermined thickness is provided at both the outer sides of the metal substrate layer and the silver (Ag) layer of the superconducting wires than when the metal conducting layer is not included in the superconducting wire.

And the minimum short-circuit condition may be 50 KA/sec or 25 KA/0.5 sec.

And the conducting layer may be soldered onto the superconducting wires.

And solders for soldering the conducting layer onto the superconducting wires may comprise tin (Sn), lead (Pb), and silver (Ag), and have a melting point of 200° C. or less.

And surfaces of the superconducting wires may be plated with copper or side surfaces of the superconducting wires are soldered to use the conducting layer as a return conductor of fault current, together with the metal substrate layer and the silver (Ag) layer of the superconducting wires.

According to an aspect of the present invention, the present invention provides a superconducting cable comprising a plurality of conductor wires compressed into a round shape or a cylindrical pipe shape, a plurality of superconducting wires arranged at outer sides of the conductor wires to form an at least one-layer superconducting conductor layer, insulating paper configured to form an insulating layer by winding outer sides of the superconducting wires forming the superconducting conductor layer a plurality of times and a plurality of superconducting wires arranged at an outer side of the insulating paper to form an at least one-layer superconducting shield layer, wherein a thin metal layer is added to opposite surfaces of each of the superconducting wires of the superconducting conductor layer and the superconducting shield layer.

And the thin metal layer may be formed of a brass material to a thickness of 0.1 mm to 0.2 mm.

And wherein the thin metal layer may be soldered using solders formed of tin (Sn), lead (Pb), and silver (Ag).

And in order to electrically connect the superconducting wires and the thin metal layer to each other, side surfaces of the superconducting wires may be soldered or surfaces of the superconducting wire are coated with copper, and the thin metal layer may be used as a return circuit of fault current.

And tensile strength of the superconducting wires having added thereto the thin metal layer may be 200 Mpa to 800 Mpa with respect to a 95% current attenuation (IC relentation) criterion.

Advantageous Effects

In a superconducting cable according to the present invention, the physical rigidity of superconducting wires may be reinforced by adding a conducting layer in the form of a metal thin-film layer to the superconducting wires.

In the superconducting cable according to the present invention, a shunt path of fault current is diversified owing to the conducting layer in the form of a metal thin-film layer and thus the diameter (or the cross-sectional area) or the weight of a former may be reduced.

Furthermore, in the superconducting cable according to the present invention, a conducting layer for conducting fault current is added to the superconducting wires and thus the diameter of a former formed at a center part of the superconducting cable to serve as a return circuit of the fault current is reduced than that in the related art, thereby reducing the diameter of the entire superconducting cable.

In addition, the size, production costs, and other expenses of the superconducting cable according to the present invention may be reduced by reducing the size of the former which forms a core of the superconducting cable.

MODE OF THE INVENTION

Hereinafter, exemplary embodiments of the present invention will be described in detail with reference to the accompanying drawings. However, the present invention is not limited to the embodiments set forth herein and may be embodied in many different forms. Rather, these embodiments are provided so that this disclosure will be thorough and complete and will fully convey the concept of the invention to those of ordinary skill in the art. The same reference numerals represent the same elements throughout the present disclosure.

Figure 1:
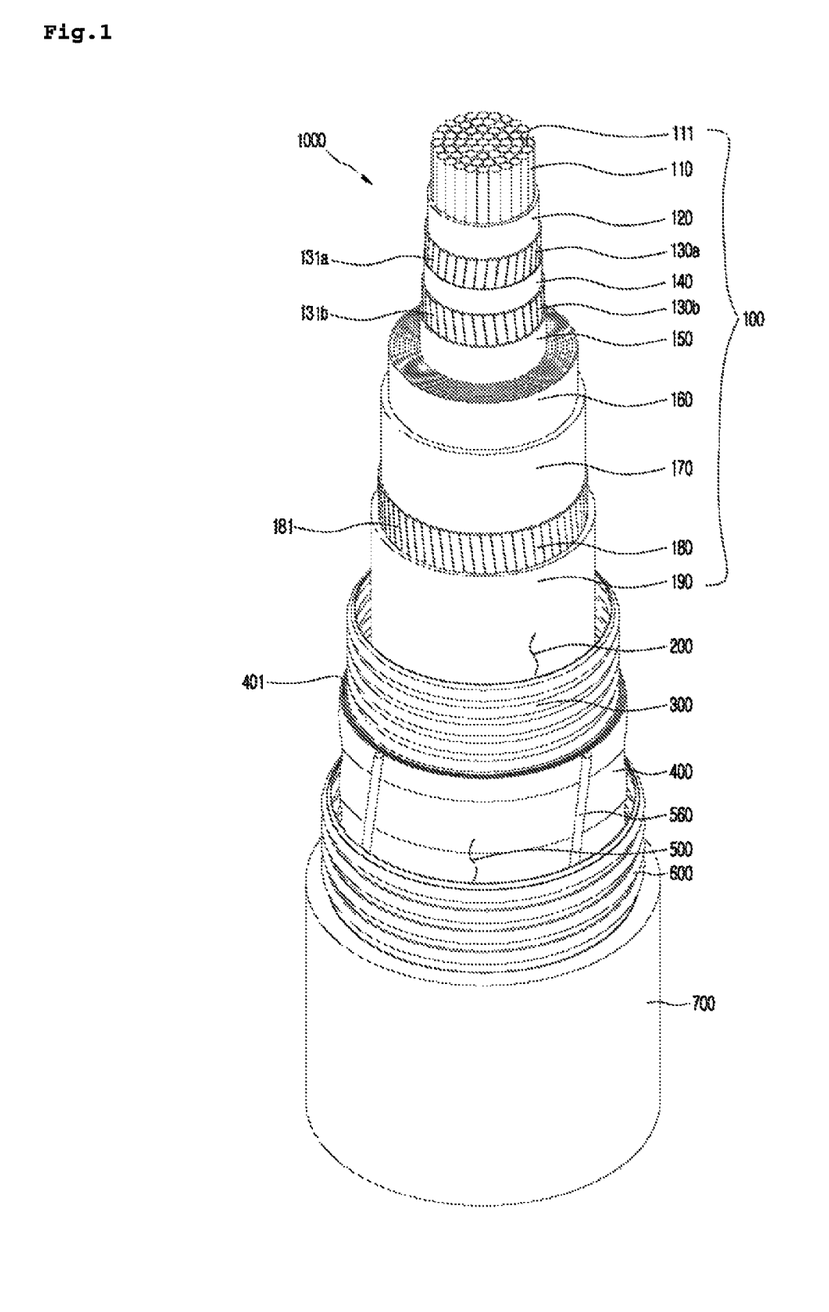
FIG. 1 is a cutaway perspective view of a superconducting cable according to an embodiment of the present invention.
Figure 2:
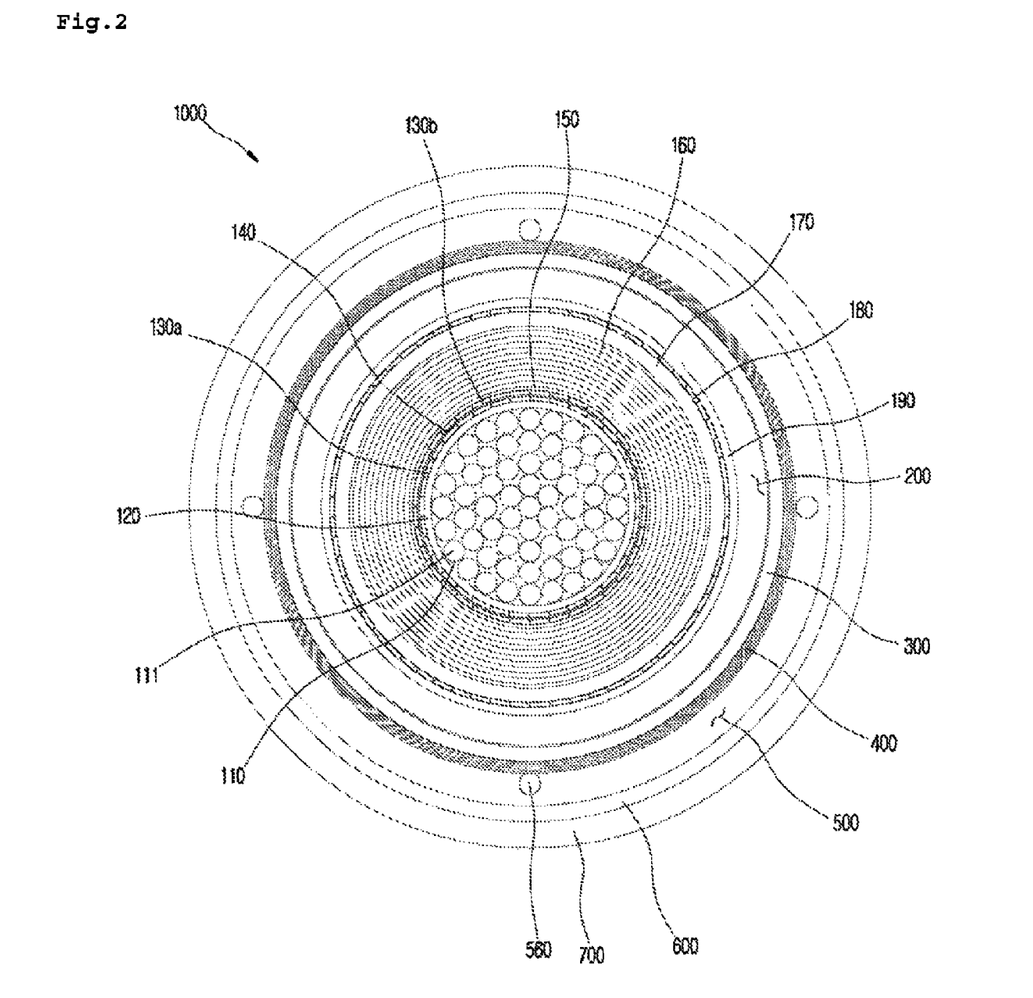
FIG. 2 is a cross-sectional view of the superconducting cable of FIG. 1.

FIG. 1 is a cutaway perspective view of a superconducting cable according to an embodiment of the present invention. FIG. 2 is a cross-sectional view of the superconducting cable of FIG. 1.

A basic structure of a superconducting cable according to the present invention will be described below.

The superconducting cable of FIG. 1 may include a core part 100 including a former 110, an at least one-layer superconducting conductor layer 130 having a plurality of superconducting wires arranged in parallel in a lengthwise direction of the former 110 to cover an outer side of the former 110, an insulating tape 140 covering the superconducting conductor layer 130, and an at least one-layer superconducting shield layer 180 having a plurality of superconducting wires arranged in parallel in the lengthwise direction of the former 110 to cover an outer side of the insulating tape 140; a cooling part 200 provided at an outer side of the core part 100 to cool the core part 100 and having a refrigerant channel of a liquid refrigerant for cooling the core part 100; an inner metal conduit 300 provided at an outer side of the cooling part 200; an insulating part 400 provided at an outer side of the inner metal conduit 300 to form an insulating layer wound with an insulator 401 in multiple layers; a vacuum part 500 having a plurality of spacers 560 arranged at spaced points on an outer side of the insulating part 400 to vacuum-insulate the cooling part 200; an outer metal conduit 600 provided at an outer side of the vacuum part 500; and an external jacket 700 provided at an outer side of the outer metal conduit 600 to form a sheath layer.

These elements of the superconducting cable will be sequentially described below. The former 110 may provide a place for installing flat and long superconducting wires around the former 110, serve as a frame for forming a desired shape, and be a path through which fault current flows. The former 110 may have a form in which a plurality of copper (Cu) conductor wires 111 each having a round cross section are compressed into a round shape.

In detail, basically, the former 110 has a round cylindrical shape and may thus serve as a frame for lifting the flat and long superconducting wires. A diameter of the former 110 is determined by taking into account a width of the superconducting wires, such that the superconducting wires do not peel off and the superconducting wires have a structure very similar to a round shape when the superconducting wires are lifted on the former 110.

As illustrated in FIGS. 1 and 2, the former 110 may have a solid center part but may have a hollow pipe shape to serve as not only a frame for lifting the superconducting wires but also a path in which a refrigerant is moved. The conductor wires 111 of the former 110 may be formed of copper or the like. By connecting the conductor wires 111 to the superconducting wires in parallel, the former 110 may serve as a return conductor when fault current is generated in an electric power system due to a short circuit of this system (caused by quenching, lightning, dielectric breakdown, or the like).

When fault current is generated in an electric power system, not only the former 110 having the conductor wires 111 but also a conducting layer attached to each of the superconducting wires and formed of a metal having a current-carrying property at room temperature, as will be described below, may act as return conductors. The conducting layer may be in the form of a tape shape formed of a metal, as will be described in detail below.

Cross-sectional areas of conductors (such as copper) of the superconducting wires may be determined by the intensity of fault current. When the fault current has a high voltage, copper wires may be compressed into a round shape and twisted together.

As will be described below, the conducting layer formed of the metal having the current-carrying property at room temperature is provided at opposite surfaces of the superconducting wires of the superconducting cable according to the present invention so as to reinforce the mechanical rigidity of the superconducting wires. The conducting layer reinforces the mechanical rigidity of the superconducting wires to prevent the superconducting wires from being broken due to torsion stress applied thereto during winding of the superconducting wires.

The conducting layer described above may reinforce the mechanical rigidity of the superconducting wires, and serve as a return circuit together with the former 110 when an accident such as a short circuit occurs. Thus, the former 110 of the superconducting cable according to the present invention may have a diameter which is less than that of a former of a general superconducting cable according to the related art, as will be described below.

The former 110 may have an embossed surface since the conductor wires 111 each having a round cross section of the former 110 are compressed into a round shape and twisted together. Thus, a planarizing layer 120 may be coated on the outer side of the former 110 to planarize the embossed surface of the former 110. The planarizing layer 120 may be formed of a material such as semiconducting carbon paper, a brass tape, or the like.

Although not shown, a cushion layer may be further provided between the planarizing layer 120 and the superconducting conductor layer 130. The cushion layer may be provided using a semiconducting carbon paper tape to protect the superconducting conductor layer 130.

A first superconducting conductor layer 130*a* may be provided at the outer side of the former 110 planarized by the planarizing layer 120 by winding a plurality of superconducting wires 131*a* around the outer side of the former 110. The first superconducting conductor layer 130*a* may be installed to wind the perimeter of the planarizing layer 120 with the superconducting wires 131 in parallel.

Furthermore, as illustrated in FIG. 1, the superconducting conductor layer 130 may be formed in multiple layers according to the intensity of electric current to be transmitted or supplied through the superconducting cable.

In the embodiment of FIG. 1, a total of two superconducting conductor layers 130*a* and 130*b* are provided. When the two superconducting conductor layers 130*a* and 130*b* are simply deposited, the intensity of current does not increase due to the skin effect of current. To solve this problem, when the two superconducting conductor layers 130*a* and 130*b* are formed in multiple layers, the insulating tape 140 may be provided between the superconducting conductor layers 130*a* and 130*b*. The insulating tape 140 may be arranged between the superconducting conductor layers 130*a* and 130*b* to insulate them from each other, thereby preventing the skin effect from occurring in the stacked superconducting wires. Due to the insulating tape 140, directions in which current is carried through the superconducting conductor layers 130*a* and 130*b* stacked in multiple layers may be the same.

In the embodiment of FIG. 1, the superconducting conductor layer 130 includes a total of two layers, i.e., the first superconducting conductor layer 130*a* and the second superconducting conductor layer 130*b*, but may include more than two layers if needed, Superconducting wires of each of the superconducting conductor layers 130*a* and 130*b* may be connected in parallel to the element wires of the former 110, so that while current flows through the superconducting wires, fault current may be shunted to the element wires of the former 110 when an accident such as a short circuit (quenching, lightning, dielectric breakdown, destruction of a superconductivity condition, or the like) occurs. The superconducting wires may be prevented from being heated or damaged according to the above method.

An inner semiconducting layer 150 may be provided at an outer side of the second superconducting conductor layer 130*b* provided at an outer side of the first superconducting conductor layer 130*a*. The inner semiconducting layer 150 may be provided to relieve the concentration of an electric field in each of regions of the superconducting conductor layer 130 and to uniformize an electric field on a surface of the superconducting conductor layer 130. In detail, the inner semiconducting layer 150 may be provided to relieve the concentration of an electric field at corners of the superconducting wires and uniformize a distribution of an electric field. An outer semiconducting layer 170 which will be described below may be provided for the same reasons.

The inner semiconducting layer 150 may be provided according to a method of rolling a semiconducting tape.

An insulating layer 160 may be provided at an outer side of the inner semiconducting layer 150. The insulating layer 160 may be provided to increase the dielectric strength of the superconducting cable. In general, a cross-linked polyethylene (XLPE) cable or an oil-filled cable is used to insulate a high-voltage cable. However, the superconducting cable is cooled to extremely low temperature for the superconductivity of superconducting wires thereof but the XLPE may be broken at the extremely low temperature, thereby causing dielectric breakdown to occur. The oil-filled cable may cause an environment problem to occur. Thus, in the superconducting cable according to the present invention, insulating paper which is a general paper material may be used as the insulating layer 160. The insulating layer 160 may be formed by rolling the insulating paper a plurality of times.

As the insulating paper, Kraft paper or polypropylene laminated paper (PPLP) is generally used. PPLP insulating paper among various paper insulating materials is used to easily wind the superconducting cable and in consideration of dielectric strength characteristics thereof.

The outer semiconducting layer 170 may be provided at an outer side of the insulating layer 160. Similarly, the outer semiconducting layer 170 may be provided to relieve the concentration of an electric field in each of the regions of the superconducting conductor layer 130 and uniformize an electric field on a surface of the superconducting conductor layer 130. Furthermore, the outer semiconducting layer 170 may be also installed by rolling a semiconducting tape.

The superconducting shield layer 180 may be provided at an outer side of the outer semiconducting layer 170. A method of forming the superconducting shield layer 180 may be similar to a method of forming the superconducting conductor layer 130. When the outer semiconducting layer 170 has an uneven surface, a planarizing layer (not shown) may be provided if needed. Superconducting wires may be arranged in parallel at an outer side of the planarizing layer in a circumferential direction to form the superconducting shield layer 180.

The amount of current conducted through the superconducting shield layer formed of second-generation superconducting wires may be designed to be about 95% of that of current flowing through the superconducting conductor layer 130, thereby minimizing a stray magnetic field.

A core sheath layer 190 serving as a sheath of the core part 100 may be provided at an outer side of the superconducting shield layer 180. The core sheath layer 190 may include various tapes, binders, or the like, serve as a sheath to expose the core part 100 via a cooling layer to be described below, bind all the elements of the core part 100, and may be formed of a metal tape such as a SUS material.

The core part 100 of the superconducting cable may be configured according to the method described above. Although FIGS. 1 and 2 illustrate that the planarizing layer and the semiconducting layer are formed in a single layer using the same material, various additional layers may be added if necessary.

The cooling part 200 may be provided at the outer side of the core part 100. The cooling part 200 may be provided to cool the superconducting wires of the core part 100, and may include a liquid-refrigerant circulation channel at an inner side thereof. Liquid nitrogen may be used as the liquid refrigerant. The liquid refrigerant (liquid nitrogen) may circulate through the refrigerant channel to maintain an extremely low-temperature condition which is a superconductivity condition of the superconducting wires of the core part 100 inside the cooling part 200 in a state in which the liquid refrigerant is cooled at about $-200°$ C.

The refrigerant channel of the cooling part 200 may allow the liquid refrigerant to flow in one direction. The liquid refrigerant may be collected using a superconducting-cable joint box or the like, and cooled and supplied again to the refrigerant channel of the cooling part 200.

The inner metal conduit 300 may be provided at the outer side of the cooling part 200. The inner metal conduit 300 may serve as a sheath of the superconducting cable for preventing the core part 100 from being mechanically damaged during installation and driving of the superconducting cable, together with the outer metal conduit 600 to be described below. The superconducting cable is wound around a drum to be easily manufactured or transferred, and installed by being unwound from the drum. Accordingly, bending stress or tensile stress may be continuously applied to the superconducting cable.

The inner metal conduit 300 may be provided to maintain the initial performance of the superconducting cable even when such mechanical stress is applied to the superconducting cable. Thus, the inner metal conduit 300 may have a corrugated structure in which peaks and valleys are repeatedly formed in a lengthwise direction of the superconducting cable to reinforce the rigidity of the superconducting cable against mechanical stress. The inner metal conduit 300 may be formed of a material such as aluminum.

The inner metal conduit 300 is provided at the outer side of the cooling part 200 and may thus have extremely low temperature corresponding to the temperature of the liquid refrigerant. Thus, the inner metal conduit 300 may be classified as a low-temperature metal conduit.

Furthermore, the insulating part 400 having an insulating layer in which an insular coated with a thin polymer having low heat conductivity is wound in multiple layers around a metal film having high reflectance may be provided on an outer circumferential surface of the inner metal conduit 300. The insulating layer may be provided to form multi-layer insulation (MLI) and block invasion of heat into the inner metal conduit 300.

In particular, since the inner metal conduit 300 is formed of a metal, heat exchange or invasion is likely to occur through conduction. The insulating part 400 may be mainly used to minimize heat exchange or invasion occurring through conduction, and is formed of a metal-film material having high reflectance and may thus prevent heat exchange or heat invention occurring through radiation due to the metal film having high reflectance.

The number of layers of the insulating part 400 may be adjusted to minimize thermal invasion. When the insulating part 400 includes a large number of layers, an effect of blocking radiant heat is high but an effect of blocking conductive heat and an effect of blocking heat using convection current occurring as a vacuum layer has a thin thickness are low. Thus, it is important to form the insulating part 400 in an appropriate number of layers.

The vacuum part 500 may be provided at the outer side of the insulating part 400. The vacuum part 500 may be provided to minimize transfer of heat toward the insulation layer due to convection current or the like, caused when heat insulation is not sufficiently conducted by the insulating part 400.

The vacuum part 500 may be made by forming a separate space at the outer side of the insulating part 400 and making the separate space be in a vacuum state.

The vacuum part 500 may include at least one spacer 560 to form a physically separate space for blocking invasion of heat to the core part 100 from an outside which is at room temperature through convention current or the like. The at least one spacer 560 may be provided in the separate space to prevent the outer metal conduit 600 or the like at an outer side of the separate space in the vacuum part 500 and the insulating part 400 at an inner side of the vacuum part 500 from being in contact with each other in all the regions of the superconducting cable. In detail, the number of spacers 560 is variable according to the type or size of the superconducting cable or the spacer 560. The superconducting cable 1000 illustrated in FIGS. 1 and 2 include four spacers but the number of the spacers is variable.

The spacer 560 may be arranged in the lengthwise direction of the superconducting cable, and be wound around an outer side of the core part 100, and particularly, the insulating part 400, in a spiral or round shape.

Three to five spacers 560 may be included in the superconducting cable according to the present invention. The spacers 560 may form a separate space to prevent exchange of heat through conduction and be formed in one layer or multiple layers.

A material of the spacer 560 may be a polyethylene-based material (e.g., FEP, PFA, ETFE, PVC, P.E, or PTFE).

Alternatively, the spacer 560 may be formed of a polytetrafluoroethylene (PTFE) material if necessary, or may be formed of general resin or a polyethylene material and a surface thereof may be then coated with PTEE or the like. In this case, the PTEE may be Teflon.

Teflon is a type of fluoride resin, and is a very stable compound owing to a strong chemical bond between fluorine and carbon and thus has characteristics, such as an almost perfect chemical inert property, heat resistance, non-viscosity, high insulation stability, a low friction coefficient, etc. Furthermore, Teflon is slightly flexible and may thus spirally cover the insulating part 400 and be arranged while being wound in the lengthwise direction of the superconducting cable. Teflon has a certain degree of hardness and may be thus used as a separating means preventing the insulating part 400 and the outer metal conduit 600 from being in contact with each other, thereby physically maintaining the separate space in the vacuum part 500. The spacer 560 may have a diameter of about 4 mm to 8 mm. A cross section of the spacer 560 may have various shapes, e.g., a round shape, a triangle shape, a tetragonal shape, or a star shape.

The outer metal conduit 600 may be provided at an outer side of the vacuum part 500 having the spacer 560. The shape and material of the outer metal conduit 600 may be the same as those of the inner metal conduit 300. The outer metal conduit 600 may have a larger diameter than that of the inner metal conduit 300 so that the separate space may be formed using the spacer 560. The spacer 560 will be described in more detail below.

The external jacket 700 serving as a sheath for protecting the inside of the superconducting cable may be provided at an outer side of the outer metal conduit 600. A sheath material which is used as an external jacket of a general power cable may be used as the external jacket 700. The external jacket 700 may prevent the outer metal conduit 600 therein from being corroded and protect the superconducting cable from an external force. The external jacket may be formed of a material such as polyethylene (PE) or polyvinyl chloride (PVC).

Figure 3:
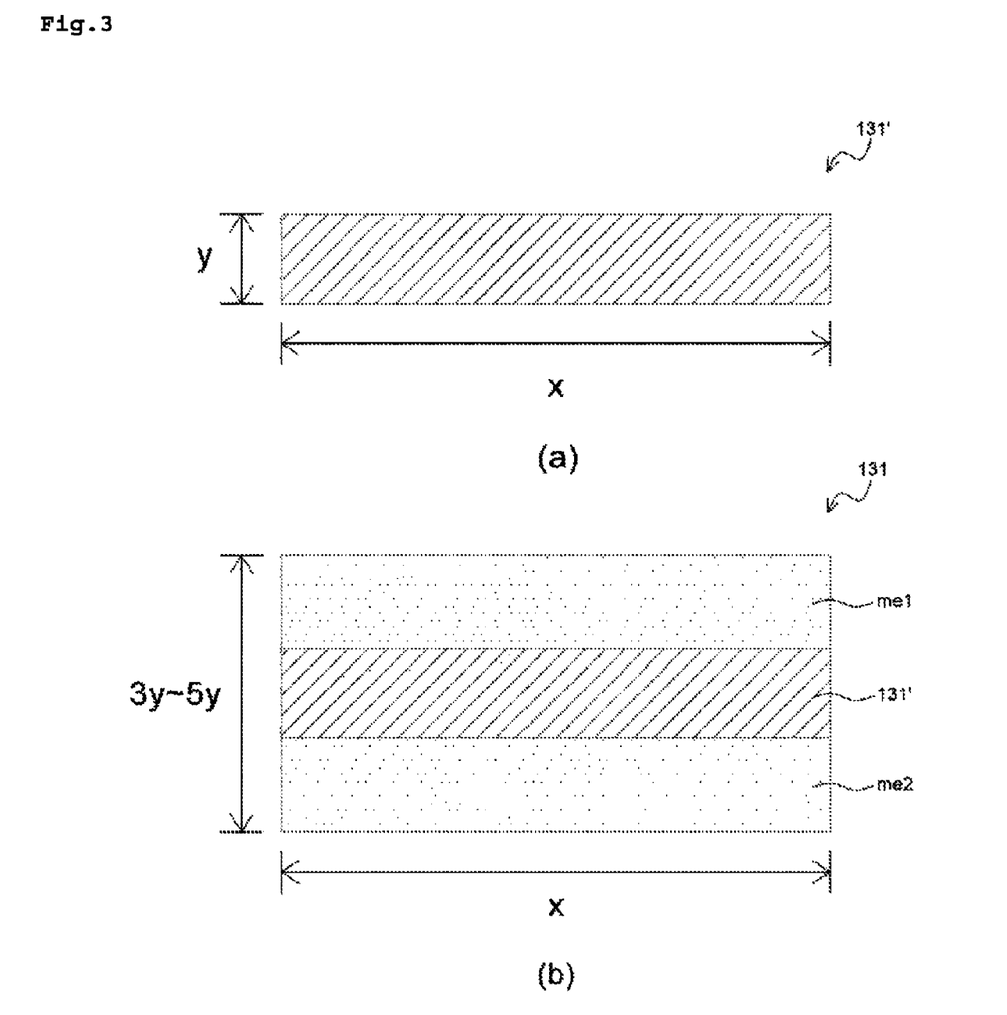
FIG. 3 illustrates an example of a superconducting wire applicable to a superconducting cable.

FIG. 3 illustrates an example of a superconducting wire applicable to a superconducting cable. In detail, FIG. 3(a) is a cross-sectional view of a conventional superconducting wire 131' having no conducting layer. FIG. 3(b) is a cross-sectional view of a superconducting wire 131 having added thereto a conducting layer formed of a metal having a current-carrying property at room temperature.

As described above, in a superconducting cable according to the present invention includes a core part 100, a former 110 having a plurality of copper wires 111, a superconducting conductor layer 130 having a plurality of superconducting wires 131, an insulating layer, and a superconducting shield layer 180 having and a plurality of superconducting wires are sequentially formed.

Conducting layers me1 and me2 formed of a metal having a current-carrying property at room temperature are provided on opposite surfaces of the superconducting wires 131 in order to reinforce the mechanical rigidity of the superconducting wires 131.

Furthermore, a cross sectional area of the former 110 may be less than that of a former designed on an assumption that all fault current will flow to a former of a superconducting cable having superconducting wires to which a conducting layer is not added.

Superconducting wires of a superconducting cable are spirally wound in a lengthwise direction of the superconducting cable and thus torsion stress is continuously applied thereto. Thus, the superconducting wires may be broken during the manufacture of the superconducting cable or during the winding of the superconducting wires. In the superconducting cable, the former 110 is used as a return conductor when an accident such as a short circuit (quenching, lightning, dielectric breakdown, destruction of a superconductivity condition, etc.) occurs as described above.

The conducting layers me1 and me2 formed of the metal having the current-carrying property at room temperature are provided at the opposite surfaces of the superconducting wires 131 of the superconducting cable according to the present invention. Thus, the mechanical rigidity of the superconducting wires may be reinforced, and the conducting layers me1 and me2 serve as return conductors together with the former 110 when a short-circuit accident occurs in a superconducting system. Accordingly, the former 110 may have a diameter which is less than that of a former of a superconducting cable having superconducting wires which do not include the conducting layers me1 and me2, and thus, a diameter and weight of the superconducting cable may be reduced, as will be described in detail below.

In the superconducting cable according to the present invention, the conducting layers me1 and me2 formed of the metal having the current-carrying property at room temperature are added to the superconducting wires so as to reinforce the rigidity of the superconducting wires. The added conducting layers me1 and me2 may be also used as return circuits of fault current. Thus, a cross-sectional area of the former 110 may be less than that of a former of a superconducting cable having superconducting wires to which a conducting layer is not added.

That is, when the conducting layers me1 and me2 formed of the metal having the current-carrying property are not added to the superconducting wires, a most part of fault current may flow to only the former. Although the former is designed to have a cross-sectional area appropriate for handling all fault current, fault current may be also shunted to the conducting layers me1 and me2 when the conducting layers me1 and me2 formed of the metal having the current-carrying property are added to the superconducting wires. Accordingly, during design of the former, a cross-sectional area of the former may be determined by taking into account a cross-sectional area of the entire conducting layer.

As illustrated in FIG. 3, if the superconducting wires 131 of the superconducting conductor layer 130 has a width of x mm and a thickness of y mm, a minimum cross-sectional area of the former satisfying a minimum short circuit condition which is a minimum current-carrying rate condition required for a predetermined time when an electrical short circuit accident occurs is A $mm^2$ or more, and the conducting layers me1 and me2 formed of the metal having the current-carrying property at room temperature are added to opposite surfaces of the superconducting wires of the superconducting conductor layer to reinforce the mechanical rigidity of superconducting wires, the former may have a minimum cross-sectional area less than A $mm^2$, as will be described in more detail below.

The conventional superconducting wire 131' of FIG. 3(a) has a width of x mm and a thickness of y mm. In contrast, the conducting layers me1 and me2 formed of a metal and having a width of x mm and a thickness of y mm to 2y mm are respectively added to opposite surfaces of the superconducting wire 131 of FIG. 3(b) applied to a superconducting cable according to the present invention, compared to the conventional superconducting wire.

Thus, the superconducting wire 131 applied to the superconducting cable according to the present invention includes a conducting layer having a thickness of y mm to 2y mm and may thus have a thickness of 3y mm to 5y mm, compared to the conventional superconducting wire 131'.

The conducting layer may be added to the conventional superconducting wire 131' by soldering, as will be described below.

If the conducting layers me1 and me2 are respectively added to the opposite surfaces of the superconducting wires 131 by soldering, and side surfaces of the superconducting wires 131 are soldered or all surfaces of the superconducting wires 131 are coated with a metal, fault current may be shunted to the conducting layers me1 and me2 added to the superconducting wires 131, as well as element wires of the former 110 connected in parallel to the superconducting wires 131, when an accident such as a short circuit occurs. Thus, the conducting layers me1 and me2 may serve as return conductors, together with the former 110.

Although each of the conducting layers me1 and me2 has a width of x mm and a thickness of y mm to 2y mm, the conducting layers me1 and me2 are respectively added to opposite surfaces of a conventional superconducting wire having a thickness of y mm. Thus a current-carrying capability may be greater due to the surface effect or the like than that when only one conducting layer having a thickness of 2y mm to 4y mm is added to one surface of the conventional superconducting wire.

The rigidity of a superconducting wire may be reinforced by minimizing separation of a conducting layer during bending of the superconducting wire when the conducting layer is added to opposite surfaces of the superconducting wire than when the conducting layer is added to one surface of the superconducting wire. Furthermore, in order to use the conducting layer as a return conductor, the conducting layer may be preferably added to the opposite surfaces of the superconducting wire and the diameter of the former may be preferably decreased.

In detail, results of an experiment and a simulation revealed that the tensile strength of the superconducting wire 131 having added thereto the conducting layers me1 and me2 as metal thin-film layers having a current-carrying property at room temperature was about 200 megapascal (Mpa) to 800 Mpa with respect to a 95% current attenuation (IC relentation) criterion when the superconducting wire 131 having added thereto the conducting layers me1 and me2 formed of brass was configured to have a thickness of 3y to 5y as illustrated in FIG. 3(b), and a sufficient rigidity of the superconducting wire 131 was secured when the semiconductor wire 131 was wound around the superconducting cable, and the former may have a minimum cross-sectional area of 0.6 A $mm^2$ to 0.9 A $mm^2$.

In detail, in a superconducting cable to which a superconducting wire having added thereto no conducting layer and having a width of x mm and a thickness of y mm is applied, a former may have a minimum cross-sectional area of 0.6 A $mm^2$ to 0.9 A $mm^2$ when a minimum cross-sectional area of the former satisfying a minimum short circuit condition which is a minimum current-carrying rate condition required for a predetermined time when an electrical short circuit accident occurs is A $mm^2$ or more, the conducting layer is formed of a brass material, and the superconducting wire having added thereto the conducting layer has a thickness of 3y to 5y.

The 95% current attenuation (IC relentation) criterion is a test method of measuring a tensile force by gradually increasing a tensile force applied to opposite ends of the superconducting wire until 95% of an initial electric current rate is secured. Thus, it means that at least 95% of a current-carrying rate may be secured when a tensile force of 200 Mpa to 800 Mpa is applied to the superconducting wire.

Here, a conventional superconducting wire has a thickness of about 0.1 mm and each conducting layer has a thickness of about 0.1 mm to 0.2 mm, whereas superconducting wires of a superconducting cable according to the present invention each have a thickness of 0.3 mm to 0.5 mm. Thus, it appears that the thickness of the superconducting wires of the superconducting cable according to the present invention is greater than that of the conventional superconducting wire. However, the thickness of the improved superconducting wires is just substantially the same as that of a thin film and thus has no significant effect on the thickness of the entire superconducting cable. However, a cross-sectional area of the former crowded with uninsulated element wires may be decreased by about 10 to 40 percentages as described above.

Furthermore, in a simulation related to the cross-sectional area of the former, power of 50 KA/sec or 25 KA/0.5 sec was used to transmit or supply electric current in a short-circuit condition of the former. Although this value may be different according to a country or a power supplier, the rigidity of the superconducting wires may be reinforced and the minimum cross-sectional area of the former satisfying the minimum short-circuit condition may be reduced on the same principle.

Thus, a minimum cross-sectional area of a former of a conventional superconducting cable satisfying a minimum short-circuit condition when a short-circuit accident occurs during transmission or supply of power is 1 A ($mm^2$). In contrast, a minimum cross-sectional area of a former of a superconducting cable according to the present invention may be about 0.6 A ($mm^2$) to 0.9 A ($mm^2$) which is less than 1 A $mm^2$.

However, it is concluded that the area of the superconducting conductor layer was not simply increased as the area of the former decreased but a degree to which the area of the former decreased may be far higher than a degree to which the area of the entire superconducting conductor layer increased. It is assumed that this was due to the current-carrying capability according to the skin effect obtained by adding the conducting layer to opposite surfaces of the superconducting wires of the superconducting cable according to the present invention.

Figure 4:
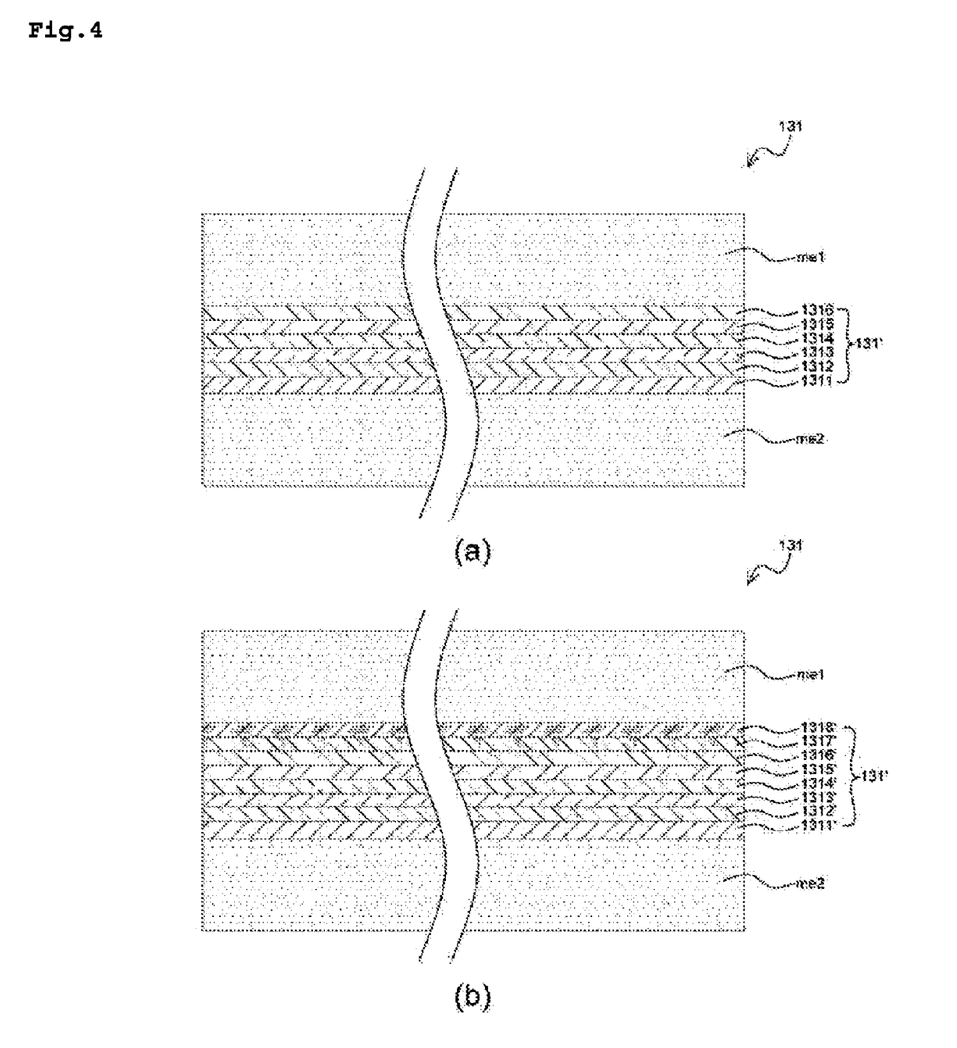
FIG. 4 is a cross-sectional view illustrating examples of a superconducting wire applicable to a superconducting cable according to the present invention.

FIG. 4 is a cross-sectional view of superconducting wires included in a superconducting cable according to the present invention.

In detail, FIG. 4(a) is a cross-sectional view of a superconducting wire applicable to a superconducting cable, according to an embodiment of the present invention. FIG. 4(b) is a cross-sectional view of a superconducting wire according to another embodiment.

For convenience of explanation, the superconducting 131 of the superconducting conductor layer 130 will be described as an example below.

A superconducting wire of a superconducting cable according to the present invention may be a first-generation (1G) superconducting wire or a 2G superconducting wire.

A phenomenon that an electric resistance becomes zero at a specific temperature or low is referred to as superconductivity. Superconductivity occurring at about 100K (−173° C.) which is higher than OK which absolute zero (−273° C.) is referred to as high-temperature superconductivity. In the field of power cable, a high-temperature superconductor is used as a superconducting wire. A 1G wire consisting principally of a silver (Ag) base material and BSCCO and a coated conductor (CC) type 2G wire consisting principally of YBCO or ReBCO have been introduced as high-temperature superconductors. A 2G superconducting wire should be understood as a superconducting wire in which a YBCO, a ReBCO (Re=Sm, Gd, Nd, Dy, Ho) material, or the like is generally used as a superconducting material of a deposition layer thereof.

Specifically, the 2G superconducting wire may include a metal substrate layer, deposition layers, a silver (Ag) layer, etc. The metal substrate layer may be used as a base member of the superconducting wire, maintain the mechanical strength of the superconducting wire, and be formed of a material such as Hastelloy or a nickel-tungsten (Ni—W) alloy. The deposition layers may include buffer layers for depositing a superconducting layer on a metal substrate, and the superconducting layer to be used as a conduction path when current is conducted.

The silver (Ag) layer may include a silver (Ag) or copper (Cu) alloy layer. The silver (Ag) alloy layer may be interposed between the superconducting layer and the copper (Cu) alloy layer, and enable layer deposition. The copper (Cu) alloy layer may reinforce the mechanical strength of the superconducting wire. A thickness and a material of each of these alloy layers may vary according to the type of an application device, and each of these alloy layers have a current-carrying property at room temperature.

A superconducting wire of a superconducting cable according to the present invention may be a 1G or 2G superconducting wire. The 1G superconducting wire and the 2G superconducting wire are the same in that the 1G superconducting wire uses silver (Ag) as a base material and the 2G superconducting wire includes a silver (Ag) layer. Thus, the silver (Ag) base material of the 1G superconducting wire and the silver (Ag) layer of the 2G superconducting wire may serve as return conductors of fault current, together with a conducting layer to be described below.

Accordingly, the 1G or 2G superconducting wire may contribute to decreasing the diameter of a former of the superconducting cable.

The superconducting wires of the superconducting cable illustrated in FIG. 4 according to the present invention are 2G superconducting wires, and may be superconducting wires including a metal substrate layer formed of a nickel-tungsten (Ni—W) alloy. Although FIG. 4 illustrates cases in which two types of superconducting wires are applied, the same effect may be obtained when a conducting layer is added to a 1G superconducting wire.

FIG. 4(a) illustrates a superconducting wire 131 using a YBCO-based superconducting material. FIG. 4(b) is a cross-sectional view of a superconducting wire 131 using a ReBCO-based superconducting material.

A material of a metal substrate layer 1311 included in the superconducting wire 131 of FIG. 4(a) may be a nickel-tungsten (Ni—W) alloy. The metal substrate layer 1311 may be in the form of a tape formed of a metal.

Deposition layers including a plurality of buffer layers 1312, 1313, and 1314 and a YBCO-based superconducting layer 1315 may be provided on the metal substrate layer 1311 formed of the nickel-tungsten (Ni—W) alloy.

In the embodiment of FIG. 4(a), the three-layer buffer layers 1312, 1313, and 1314 may be deposited. In detail, each of these buffer layers may be layers formed of a material such as $Y_2O_3$, YSZ, or $CeO_2$. The YBCO-based superconducting layer 1315 may be provided on these buffer layers. A silver (Ag) layer 1316 may be provided at an outer side of the superconducting layer 1315 to protect the superconducting wire. In the case of a 1G superconducting wire, a silver (Ag)-based base material is used. In contrast, in the superconducting wire of FIG. 4, a silver (Ag) layer is provided separately.

In the present invention, a former, an at least one-layer superconducting conductor layer having a plurality of superconducting wires 131 arranged in parallel at an outer side of the former and in a lengthwise direction of the former, and an at least one-layer superconducting shield layer having a plurality of superconducting wires 131 arranged in parallel at an outer side of the superconducting conductor layer and in the lengthwise direction of the former are provided. The superconducting wires 131 of the superconducting conductor layer 130 and the superconducting shield layer 180 include the metal substrate layer 1311, the deposition layers 1312 to 1315 deposited in multiple layers on the metal substrate layer 1311 and including a superconducting layer, and the silver (Ag) layer 1316 formed of a silver material and provided at an outer side of the deposition layers 1312 to 1315. Conducting layers me1 and me2 formed of a metal may be further provided at opposite surfaces of the superconducting wire 131, i.e., at an outer side of the metal substrate layer 1311 of the superconducting wire 131 and an outer side of the silver (Ag) layer 1316.

The conducting layers me1 and me2 formed of the metal may be provided at the top and bottom of the superconducting wire 131 of FIG. 4(a), i.e., the outer side of the substrate layer 1311 and the outer side of the silver (Ag) layer 1316.

The reason why the conducting layers me1 and me2 are provided at both the opposite sides of the superconducting wire 131 is that the physical rigidity of the superconducting wire 131 when the conducting layers me1 and me2 are provided at both the opposite sides of the superconducting wire 131 may be reinforced more than when a conducting layer is provided at only one side of the superconducting wire 131, a deviation in the physical property of the superconducting wire 131 according to a direction in which it is bent may be minimized, and a capacity of a return conductor may be increased as described above.

Furthermore, although a current-carrying function of the superconducting wires 131 of the superconducting conductor layer or the superconducting shield layer is performed according to a capacity designed on an assumption that the superconductivity condition is maintained, current flowing through superconducting wires 131 may be conducted through the former described above when the superconductivity condition is destructed due to a system error or the like, and the diameter of the former or the number of conductor wires may be determined according to a capacity for conducting fault current.

However, the diameter of the former 110 accounts for a greater part of the diameter of the entire superconducting cable and should thus be decreased to handle conduction of fault current, thereby decreasing the diameter or weight of the entire superconducting cable.

Thus, as illustrated in FIG. 4, the conducting layers me1 and me2 formed of a metal, e.g., a brass material, may be provided on the top and bottom of the superconducting wire 131 to reinforce the rigidity of the superconducting wire 131, to be used as return conductors of fault current, and to minimize the diameter of the former or the like.

The conducting layers me1 and me2 formed of the metal may be formed in a metal thin-film shape, and particularly, formed of a brass material.

Brass is an alloy made by adding zinc to copper. The conducting layers me1 and me2 formed of a metal such as a brass material may be added in the form of a metal thin-film layer such as a brass thin film. The brass thin film may have a thickness of 0.1 mm to 0.2 mm. If a conducting layer me formed of a metal and added in the form of a brass tape to one side of the superconducting wire 131 has a thickness of 0.15 mm, the entire superconducting wire 131 may have a thickness of about 0.4 mm.

A result of an experiment revealed that the rigidity of the superconducting wire 131 was difficult to be sufficiently reinforced when a conducting layer formed of a metal had a thickness of 0.1 mm or less, and the conductive layer formed of the metal was separated from the superconducting wire 131 during bending and the thickness of the superconducting wire 131 was extremely thick when the conducting layer formed of the metal had a thickness of 0.2 mm or more.

In general, the superconducting wire 131 has a thickness of about 0.1 mm. Although the thickness of the superconducting wire 131 may be increased four times, i.e., to 0.4 mm, by adding to opposite sides thereof a conducting layer having a thickness of 0.15 mm and formed of a metal and in the form of a brass tape. Nonetheless, the entire superconducting wire 131 has a thin thickness of less than 1 mm and has no significant effect on the thickness of the entire superconducting cable. However, the rigidity of the superconducting wire 131 may be reinforced and thus the superconducting wire 131 may serve as a return conductor of fault current. Accordingly, the diameter or weight of the former may be decreased.

In other words, the rigidity of the superconducting wire 131 and the diameter or weight of the former may be decreased by providing the conducting layers me1 and me2 formed of a brass material as metal thin-film layers on the top and bottom of the superconducting wire 131. Thus, the diameter or weight of the former when a conducting layer having a predetermined thickness is provided at both outer sides of the metal substrate layer and the silver (Ag) layer of the superconducting wire 131 may be decreased more than when the conducting layer is not provided on the superconducting wire 131.

When the conducting layers me1 and me2 each being formed in a metal thin-film layer using a brass material are added to the superconducting wires 131, the amount of fault current conducted through the conducting layers me1 and me2 added to all the superconducting wires 131 is 1.5% or more, and the cross-sectional area or weight of the former may be reduced by 10 to 40%, compared to another former having the same structure as the former, when a space factor of the former, the skin effect, etc. are taken into account, as described above.

As described above, the conducting layers me1 and me2 attached to the superconducting wire 131 should be electrically connected to each other, so that current flowing through a superconducting layer of the deposition layer 1315 may flow to the conducting layers me1 and me2 when fault current is generated, in a state in which the conducting layers me1 and me2 are attached to opposite sides of the superconducting wire 131 by soldering or the like Thus, the conducting layers me1 and me2 attached to opposite sides of the superconducting wires 131 may be connected in parallel to conduct fault current therethrough. Although not shown in FIG. 4, in order to electrically connect the conducting layers me1 and me2 attached to the opposite sides of the superconducting wires 131 to each other, side surfaces of the superconducting wires 131 may be soldered using metal base solders or the superconducting wires 131 may be plated with a metal having high electrical conductivity, e.g., copper (Cu).

In both these two methods, the conducting layers me1 and me2 and the superconducting wires 131 may be electrically connected to one another while minimizing an increase in the thickness or volume of the superconducting wires 131 having attached thereto the conducting layers me1 and me2.

When the metal substrate layer 1311, the deposition layers 1312 to 1315 including a superconducting layer, and the silver (Ag) layer 1316 of the superconducting wire 131 are electrically connected in parallel to one another by plating the superconducting wire 131 with copper or soldering side surfaces of the superconducting wire 131 as described above, the superconducting layer 1315, the metal substrate layer 1311, the silver (Ag) layer 1316, and the conducting layers me1 and me2 may be electrically connected to one another and fault current may be shunted to the metal substrate layer 1311 and the silver (Ag) layer 1316, as well as the conducting layers me1 and me2.

Similarly, when a conducting layer is included in a 1G superconducting wire, the conducting layer and a silver (Ag)-based base material may be used as return conductors to which fault current may be shunted, as well as a silver (Ag) layer of a 2G superconducting wire, as described above.

The amount of fault current shunted through the conducting layers me1 and me2 is 1.5% or more and the fault current is generally shunted through the former, but the metal substrate layer 1311 and the silver (Ag) layer 1316 may be also used to shunt the fault current.

The conducting layers me1 and me2 which are metal thin-film layers may be attached to the superconducting wire 131 by soldering. Solders to be used to solder the conducting layers me1 and me2 at opposite sides of the superconducting wire 131 may consist of tin (Sn), lead (Pb), and silver (Ag) and have a melting point of 200° C. or less. However, various other types of solders or various methods are applicable, provided that the conducting layers me1 and me2 and the metal substrate layer 1311 or the silver (Ag) layer 1316 of the superconducting wire 131 are attached to one another such that current is conducted therethrough.

FIG. 4(*b*) illustrates a superconducting wire 131' to which ReBCO-based superconducting material is applied. A description of parts of FIG. 4(*b*) which are the same as those described above with reference to FIG. 4(*a*) is omitted here.

A material of a metal substrate layer 1311' of the superconducting wire 131' of FIG. 4(*b*) may be a nickel-tungsten (Ni—W) alloy. Similarly, the metal substrate layer 1311' may be in the form of a thin metal layer.

Deposition layers 1312' to 1317' including at least six layers, i.e., buffer layers 1312', 1313', 1314', 1315', and 1316' and a ReBCO-based superconducting layer 1317', are provided on the metal substrate layer 1311' formed of the nickel-tungsten (Ni—W) alloy. A silver (Ag) layer 1318' may be provided at an outer side of the deposition layers 1312' to 1317'.

Seed layers of the respective buffer layers 1312', 1313', 1314', 1315', and 1316' may include an $Al_2O_3$ layer, a $Y_2O_3$ layer, an IBAD-MGo layer, an EPI-MGo layer, and a $LaMoO_3$ layer.

Similar to the embodiment of the superconducting wire 131 of FIG. 4(*a*), the superconducting wire 131' of FIG. 4(*b*) may include conducting layers me1 and me2 at outer sides of the metal substrate layer 1311' and the silver (Ag) layer 1318' to reinforce the physical rigidity of the superconducting wire 131' and shunt fault current.

As described above, the diameter of a former serving as a return conductor of fault current may be decreased by providing a conducting layer as a thin metal layer using a material, such as brass, at opposite sides of the superconducting wire 131' and using the conducting layer as a means for conducting fault current.

Although the metal substrate layer 1311' and the silver (AG) layer 1318' of the superconducting wire 131' of FIG. 4(*b*) are also formed of a metal and thus have a function of bypassing fault current, a cross-sectional area of the metal substrate layer 1311' and the silver (AG) layer 1318' is not large, compared to the thickness of a conventional superconducting wire. Thus, a capacity of bypassing fault current of the metal substrate layer 1311' and the silver (AG) layer 1318' is small.

However, as described above, a conducting layer me formed of a metal has a thickness of about 0.15 mm and thus the diameter of a former serving as a return circuit of fault current may be influenced by the amount of conducting electric current through the conducting layer me as described above.

Thus, when the diameter of the former is designed, the conducting layer me formed of the metal may be included into the superconducting wire 131' of the superconducting conductor layer, so that the diameter of the former may be reduced more than that of a conventional former by taking into account the amount of conducting fault current through the metal substrate layer 1311' and the silver (Ag) layer 1318'. A maximum allowable amount of current may be determined according to a thermal analysis method of conducting fault current through the conducting layer me formed of the metal, the metal substrate layer 1311', and the silver (Ag) layer 1318' of the superconducting wire 131' and thus the diameter of the former may be designed to be smaller.

Figure 5:
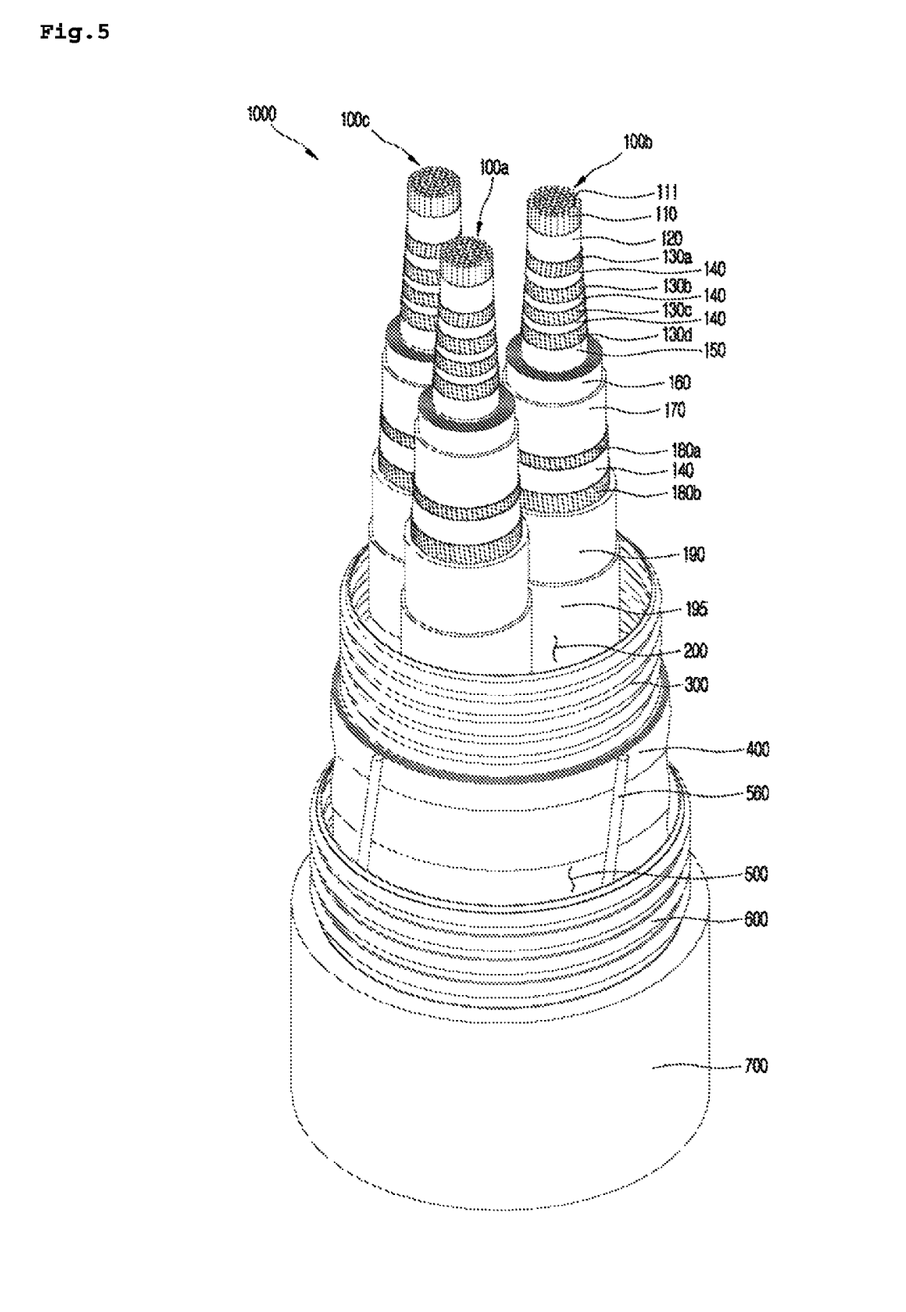
FIG. 5 is a cutaway perspective view of a superconducting cable according to another embodiment of the present invention.
Figure 6:
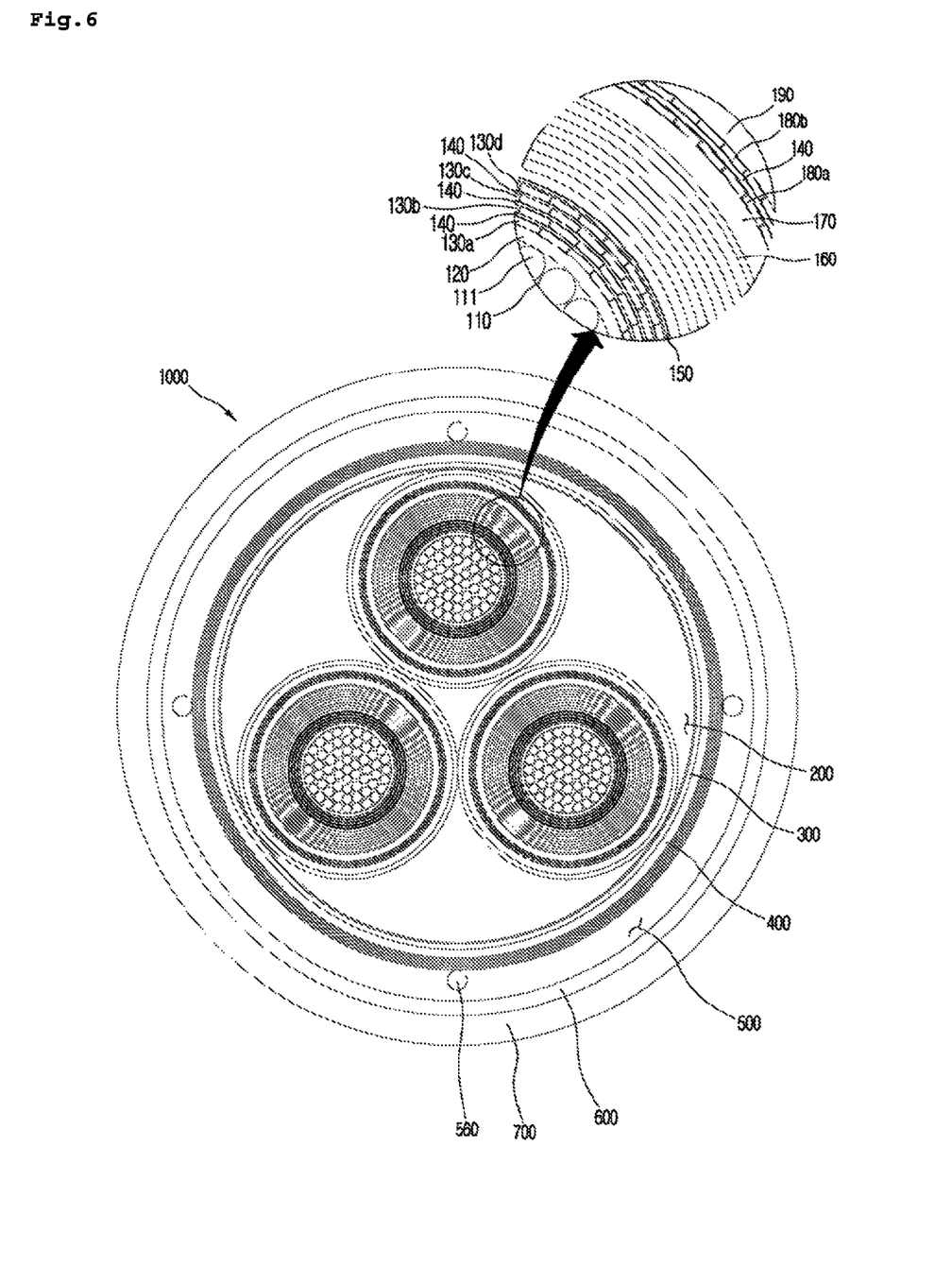
FIG. 6 is a cross-sectional view illustrating a state in which the superconducting cable of FIG. 5 is installed in a horizontal direction.

FIG. 5 is a cutaway perspective view of a superconducting cable according to another embodiment of the present invention. FIG. 6 is a cross-sectional view illustrating a state in which the superconducting cable of FIG. 5 is installed in a horizontal direction.

A description of parts of FIGS. 5 and 6 which are the same as those described above with reference to FIGS. 1 to 4 is omitted here. In the embodiment of FIGS. 5 and 5, a 3-phase superconducting cable including three core parts 100 is illustrated.

The 3-phase superconducting cable may have a structure in which each of the core parts 100 does not individually include a cooling part 200 but the cooling part 200 is provided at an outer side of the three core parts 100 to be shared by the core parts 100. A vacuum part 500 provided at an outer side of the cooling part 200 may be also shared.

Similarly, in the superconducting cable illustrated in FIGS. 5 and 6, a conducting layer may be added in the form of a thin metal layer to a superconducting wire according to the present invention, thereby reinforcing the physical rigidity of the superconducting wire. In the superconducting cable according to the present invention, a path in which fault current is shunted may be diversified by the conducting layer in the form of the thin metal layer and thus the diameters (or cross-sectional areas) or weights of formers of the respective core parts 100 may be decreased.

Although exemplary embodiments of the present invention are described in the present disclosure, it would be apparent to those of ordinary skill in the art that the present invention may be embodied in many different forms without departing from the idea and scope of the invention as defined in the appended claims. Therefore, the scope of the invention should be defined by the appended claims, and all differences within the scope will be construed as being included in the present invention.

The invention claimed is:

1. A superconducting cable comprising a core part, in which the core part includes a former including a plurality of copper wires, a superconducting conductor layer including a plurality of superconducting wires, an insulating layer, and a superconducting shield layer including a plurality of superconducting wires are sequentially arranged, wherein the former and the superconducting wires of the superconducting conductor layer are connected in parallel to each other, wherein a conducting layer formed of a metal having a current-carrying property at room temperature is provided on opposite surfaces of each of the superconducting wires of the superconducting conductor layer to reinforce mechanical rigidity of each of superconducting wires of the superconducting conductor layer, and wherein the former has a cross-sectional area which is smaller than that of a former of a superconducting cable in which the conducting layer is not added to superconducting wires and which is designed on an assumption that all fault current flows to the former.

2. The superconducting cable of claim 1, wherein a minimum cross-sectional area of the former of the core part satisfies a minimum short-circuit condition of 50 KA/sec or 25 KA/0.5 sec.

3. The superconducting cable of claim 1, wherein, in the superconducting cable to which superconducting wires having added thereto no conducting layer and having a width of x mm and a thickness of y mm is applied, if a minimum cross-sectional area of the former satisfying a minimum short-circuit condition which is a minimum current-carrying rate condition required for a predetermined time when an electrical short-circuit accident occurs is A mm2 or more, the conducting layer is formed of a brass material, and a semiconductor wire having added thereto the conducting layer has a width of x mm and a thickness of 3y to 5y, the former has a minimum cross-sectional area of 0.6 A mm2 to 0.9 A mm2.

4. The superconducting cable of claim 1, wherein the superconducting wires comprise a silver (Ag) layer, and
the conducting layer and the silver (Ag) layer of each of the superconducting wires of the superconducting conductor layer are electrically connected to each other by soldering side surfaces of the superconducting wires or coating surfaces of the superconducting wires with a metal.

5. The superconducting cable of claim 1, wherein tensile strength of the superconducting wires having added thereto the conducting layer is 200 Mpa to 800 Mpa with respect to a 95 percent current attenuation (IC relentation) criterion.

6. The superconducting cable of claim 1, wherein the conducting layer added to the opposite surfaces of each of the superconducting wires has a thickness of 0.1 mm to 0.2 mm.

7. A superconducting cable comprising:
a former;
at least one-layer superconducting conductor layer including a plurality of superconducting wires arranged in parallel at an outer side of the former and in a lengthwise direction of the former; and
at least one-layer superconducting shield layer including a plurality of superconducting wires arranged in parallel at an outer side of the superconducting conductor layer and in the lengthwise direction of the former,
wherein the superconducting wires of the superconducting conductor layer and the superconducting shield layer comprise:
a metal substrate layer;
a plurality of deposition layers deposited on the metal substrate layer, the deposition layers including a superconducting layer; and
a silver (Ag) layer provided at an outer side of the deposition layers and formed of a silver material,
wherein a conducting layer formed of a metal having a current-carrying property at room temperature is added to opposite outer surfaces of the metal substrate layer and the silver (Ag) layer of the superconducting wires, the conducting layer used as a return conductor of fault current when the fault current is generated, together with the former, and
wherein a minimum cross-sectional area of the former satisfying a minimum short-circuit condition which is a minimum current-carrying rate condition required for a predetermined time during occurrence of an electrical short-circuit accident is smaller when a metal conducting layer having a predetermined thickness is provided at both the outer sides of the metal substrate layer and the silver (Ag) layer of the superconducting wires than when the metal conducting layer is not included in the superconducting wire.

8. The superconducting cable of claim 7, wherein the metal used to form the conducting layer is a brass material.

9. The superconducting cable of claim 7, wherein the conducting layer has a thickness of 0.1 mm to 0.2 mm.

10. The superconducting cable of claim 7, wherein the minimum short-circuit condition is 50 KA/sec or 25 KA/0.5 sec.

11. The superconducting cable of claim 7, wherein the conducting layer is soldered onto the superconducting wires.

12. The superconducting cable of claim 11, wherein solders for soldering the conducting layer onto the superconducting wires comprise tin (Sn), lead (Pb), and silver (Ag), and have a melting point of 200° C. or less.

13. The superconducting cable of claim 7, wherein surfaces of the superconducting wires are plated with copper or side surfaces of the superconducting wires are soldered to use the conducting layer as a return conductor of fault current, together with the metal substrate layer and the silver (Ag) layer of the superconducting wires.

14. A superconducting cable comprising:
a plurality of conductor wires compressed into a round shape or a cylindrical pipe shape;
a plurality of superconducting wires arranged at outer sides of the conductor wires to form an at least one-layer superconducting conductor layer;
insulating paper configured to form an insulating layer by winding outer sides of the superconducting wires forming the superconducting conductor layer a plurality of times;
a former; and
a plurality of superconducting wires arranged at an outer side of the insulating paper to form an at least one-layer superconducting shield layer,
wherein a thin metal layer is added to opposite surfaces of each of the superconducting wires of the superconducting conductor layer and the superconducting shield layer,
wherein the former has a cross-sectional area which is smaller than that of a former of a superconducting cable in which the thin metal layer is not added to superconducting wires and the superconducting shield layer and which is designed on an assumption that all fault current flows to the former.

15. The superconducting cable of claim 14, wherein the thin metal layer is formed of a brass material to a thickness of 0.1 mm to 0.2 mm.

16. The superconducting cable of claim 14, wherein the thin metal layer is soldered using solders formed of tin (Sn), lead (Pb), and silver (Ag).

17. The superconducting cable of claim 14, wherein, in order to electrically connect the superconducting wires and the thin metal layer to each other, side surfaces of the superconducting wires are soldered or surfaces of the superconducting wire are coated with copper, and the thin metal layer is used as a return circuit of fault current.

18. The superconducting cable of claim 14, wherein tensile strength of the superconducting wires having added thereto the thin metal layer is 200 Mpa to 800 Mpa with respect to a 95% current attenuation (IC relentation) criterion.

* * * * *